(12) United States Patent
Nagashima et al.

(10) Patent No.: US 9,073,048 B2
(45) Date of Patent: Jul. 7, 2015

(54) EXHAUST GAS-PURIFYING CATALYST AND METHOD OF MANUFACTURING THE SAME

(75) Inventors: Hiroki Nagashima, Kakegawa (JP); Akiya Chiba, Kakegawa (JP); Satoshi Matsueda, Kakegawa (JP)

(73) Assignee: CATALER CORPORATION, Shizuoka (JP)

( * ) Notice: Subject to any disclaimer, the term of this patent is extended or adjusted under 35 U.S.C. 154(b) by 0 days.

(21) Appl. No.: 12/301,011
(22) PCT Filed: May 31, 2007
(86) PCT No.: PCT/JP2007/061127
§ 371 (c)(1),
(2), (4) Date: Nov. 14, 2008
(87) PCT Pub. No.: WO2008/004390
PCT Pub. Date: Jan. 10, 2008

(65) Prior Publication Data
US 2009/0099010 A1    Apr. 16, 2009

(30) Foreign Application Priority Data
Jul. 5, 2006   (JP) .................. 2006-185799

(51) Int. Cl.
*B01J 23/10*   (2006.01)
*B01J 23/38*   (2006.01)
(Continued)

(52) U.S. Cl.
CPC ............... *B01J 37/08* (2013.01); *B01D 53/945* (2013.01); *B01D 2255/206* (2013.01);
(Continued)

(58) Field of Classification Search
CPC .... B01J 37/08; B01J 37/0215; B01J 37/0244; B01J 37/03; B01J 23/003; B01J 23/63; B01J 21/10; B01J 35/002; B01J 2523/00; B01D 53/945; B01D 2255/206; B01D 2255/407; B01D 2255/2092

USPC ......... 502/302, 303, 304, 325, 328, 330, 332, 502/333, 334, 339, 340, 341, 344, 347, 348, 502/349, 355, 525
See application file for complete search history.

(56) References Cited

U.S. PATENT DOCUMENTS 5,910,466 A * 6/1999 Yamashita et al. ............ 502/300
6,866,834 B2   3/2005 Nakamura et al.
(Continued)

FOREIGN PATENT DOCUMENTS

EP   1 241 329 A2   9/2002
EP   1 618 951 A1   1/2006
(Continued)

OTHER PUBLICATIONS

Courson et al., "Experimental study of the SO2 removal over a NOx trap catalyst," 2002, Catalysis Communications, 3, pp. 471-477.*
(Continued)

*Primary Examiner* — Jun Li
(74) *Attorney, Agent, or Firm* — John P. White; Cooper & Dunham LLP

(57) ABSTRACT

An exhaust gas-purifying catalyst whose activity is less prone to be decreased even in the case where used in a high-temperature atmosphere containing oxygen at a high concentration can be realized. The catalytic layer of the catalyst includes an oxide particle, a simple oxide of alkaline-earth element or rare-earth element, and alumina and/or aluminum hydroxide. The oxide particle contains an oxide of rare-earth element and/or zirconium, a composite oxide and a precious metal. The composite oxide contains an alkaline-earth element and at least one of the rare-earth element and zirconium. The composite oxide and a part of the precious metal form a solid solution.

6 Claims, 3 Drawing Sheets

(51) Int. Cl.
| | |
|---|---|
| *B01J 37/08* | (2006.01) |
| *B01D 53/94* | (2006.01) |
| *B01J 21/10* | (2006.01) |
| *B01J 23/00* | (2006.01) |
| *B01J 23/63* | (2006.01) |
| *B01J 37/02* | (2006.01) |
| *B01J 35/00* | (2006.01) |
| *B01J 37/03* | (2006.01) |

(52) U.S. Cl.
CPC .. *B01D 2255/2092* (2013.01); *B01D 2255/407* (2013.01); *B01J 21/10* (2013.01); *B01J 23/002* (2013.01); *B01J 23/63* (2013.01); *B01J 35/002* (2013.01); *B01J 37/0215* (2013.01); *B01J 37/0244* (2013.01); *B01J 37/03* (2013.01); *B01J 2523/00* (2013.01); *Y02T 10/22* (2013.01)

(56) References Cited

U.S. PATENT DOCUMENTS

| | | | |
|---|---|---|---|
| 6,956,007 B2 * | 10/2005 | Cai et al. | 502/303 |
| 7,297,654 B2 * | 11/2007 | Kimura et al. | 502/326 |
| 7,332,454 B2 * | 2/2008 | Dang et al. | 502/60 |
| 2003/0185736 A1 * | 10/2003 | Hatanaka et al. | 423/263 |
| 2005/0031501 A1 * | 2/2005 | Kawai et al. | 422/180 |
| 2005/0138916 A1 * | 6/2005 | Bonadies et al. | 60/275 |
| 2005/0215428 A1 * | 9/2005 | Matsueda et al. | 502/328 |
| 2006/0019824 A1 | 1/2006 | Miyoshi et al. | |
| 2006/0252638 A1 * | 11/2006 | Matsueda et al. | 502/302 |

FOREIGN PATENT DOCUMENTS

| | | |
|---|---|---|
| JP | 4-371229 A | 12/1992 |
| JP | 05-168926 | 7/1993 |
| JP | 06-075675 | 9/1994 |
| JP | 07-051544 | 2/1995 |
| JP | 10-000358 | 1/1998 |
| JP | 2000-084405 | 3/2000 |
| JP | 2000-169148 | 6/2000 |
| JP | 2001-129399 | 5/2001 |
| JP | 2002-336700 A | 11/2002 |
| JP | 2003-038936 | 2/2003 |
| JP | 2006-035029 A | 2/2006 |
| WO | WO-2005/087373 A1 | 9/2005 |

OTHER PUBLICATIONS

Kuno et al., JP 2001-129399 PAJ translation, May 15, 2001.*
English Translation of International Preliminary Report on Patentability mailed Jan. 20, 2009, for PCT Application No. PCT/JP2007/061127, filed May 31, 2007, 12 pages.
Chinese Office Action mailed Oct. 11, 2010, for CN Application No. 200780020996.0, with English Translation, 13 pages.
Official Communication dated Nov. 7, 2012 from the European Patent Office, in connection with European Patent Application No. 07744515.3.
Derwent-WPI abstract No. 1993-048011 (1993).
Chinese Office Action mailed May 5, 2011, for CN Application No. 200780020996.0, with English Translation, 12 pages.
Feb. 7, 2012 Official Action (with English Translation) in connection with Japanese Patent Application No. JP 2008-523623.

* cited by examiner

EXHAUST GAS-PURIFYING CATALYST AND METHOD OF MANUFACTURING THE SAME

CROSS-REFERENCE TO RELATED APPLICATIONS

This application is a United States National Stage Application under 35 U.S.C. §371 of International Patent Application No. PCT/JP2007/061127, filed 31 May 2007, which claims the benefit to Japanese Patent Application No. 2006-185799, filed 5 Jul. 2006, each of which is incorporated by reference into this application as if fully set forth herein.

TECHNICAL FIELD

The present invention relates to an exhaust gas-purifying catalyst and method of manufacturing the same.

BACKGROUND ART

As an exhaust gas-purifying catalyst that treats exhaust gas of an automobile, a three-way catalyst with precious metal such as platinum supported by an inorganic oxide such as ceria or alumina has been widely used. In the three-way catalyst, the precious metal plays the role in promoting the reduction of nitrogen oxides and the oxidations of carbon monoxide and hydrocarbons. Further, the inorganic oxide plays the roles in increasing the specific surface area of the precious metal and suppressing the sintering of the precious metal by dissipating heat generated by the reactions. In particular, ceria has an oxygen storage capacity and is capable of optimizing the oxidation and reduction reactions.

In recent years, occasions when the automotive vehicle such as automobile is driven at high-speed increase as the performance of an engine increases. Additionally, in order to prevent pollution of the air, the regulations on the exhaust gas are made more stringent. Against these backdrops, temperature of the exhaust gas emitted by the automotive vehicle is on the trend of rising.

Further, the automotive vehicle is required to decrease the carbon dioxide emission in order to suppress the global warming. For these reasons, occasions when the supply of fuel to the engine is cut off in the state that the exhaust gas-purifying catalyst is heated to high temperatures are increasing.

That is, the exhaust gas-purifying catalyst is used at temperatures higher than in the past, and occasions when exposed to an atmosphere excessive in oxygen at high temperatures are increasing. For that, in order to provide the exhaust gas-purifying catalyst that delivers a sufficient performance even when used under such a condition, research and development are actively carried out.

For example, JP-A 5-168926 (KOKAI), JP-A 6-75675 (KOUHYO), and JP-A 2000-169148 (KOKAI) describe improving the heat stability of ceria to suppress the reduction in its oxygen storage capacity and the like. Specifically, JP-A 5-168926 (KOKAI) describes an exhaust gas-purifying catalyst containing an element of platinum group, activated alumina, cerium oxide, barium compound and zirconium compound. JP-A 6-75675 (KOUHYO) describes an exhaust gas-purifying catalyst in which a catalyst-supporting layer contains cerium oxide, zirconium oxide and catalytic metal, and at least parts of cerium oxide and zirconium oxide are present as a composite oxide or a solid solution. JP-A 2000-169148 (KOKAI) describes a cerium-based composite oxide represented as the general formula: $Ce_{1-(a+b)}Zr_aY_bO_{2-b/2}$.

Further, JP-A 10-358 (KOKAI) and JP-A 2001-129399 (KOKAI) describe making platinum present as platinum composite oxide to suppress the sintering of platinum. Specifically, JP-A 10-358 (KOKAI) describes an exhaust gas-purifying catalyst using a high heat-resistant composite oxide that contains platinum and at least one element selected from alkaline-earth metal elements or group IIIA elements. JP-A 2001-129399 (KOKAI) describes an exhaust gas-purifying catalyst that includes a platinum composite oxide layer containing platinum and alkaline-earth metal element on an inorganic oxide support, in which a layer of oxide of metal X, which is at least one element selected from Mg, Ca, Sr, Ba, La and Ce, is interposed therebetween.

However, even if the heat-stability of ceria were improved, the sintering of platinum would occur when the exhaust gas-purifying catalysts are exposed to an atmosphere excessive in oxygen at high temperatures, and a sufficient activity would not be achieved. Also, in order to produce platinum composite oxide with a high heat-stability, firing at high temperature is necessary. For this reason, a large majority of exhaust gas-purifying catalysts using platinum composite oxide are small in specific surface area and insufficient in activity.

DISCLOSURE OF INVENTION

An object of the present invention is to provide an exhaust gas-purifying catalyst that is less prone to cause a decrease in its activity even when used at high temperatures in an atmosphere whose oxygen concentration is high.

According to a first aspect of the present invention, there is provided an exhaust gas-purifying catalyst comprising a substrate and a catalytic layer supported by the substrate, the catalytic layer comprising an oxide particle containing an oxide of rare-earth element and/or zirconium, a composite oxide and a precious metal, the composite oxide containing an alkaline-earth element and at least one element selected from the group consisting of the rare-earth element and zirconium, and the composite oxide and a part of the precious metal forming a solid solution, a simple oxide of alkaline-earth element or rare-earth element, and alumina and/or aluminum hydroxide.

According to a second aspect of the present invention, there is provided a method of manufacturing an exhaust gas-purifying catalyst, comprising forming a catalytic layer on a substrate, the catalytic layer containing an oxide particle, a first compound including aluminum, and a second compound including an alkaline-earth element or rare-earth element, the oxide particle containing an oxide of rare-earth element and/or zirconium, a composite oxide, and a precious metal, the composite oxide containing an alkaline-earth element and at least one element selected from the group consisting of the rare-earth element and zirconium, and the composite oxide and a part of the precious metal forming a solid solution, and subjecting the catalytic layer to a heat treatment in an oxidizing atmosphere.

BEST MODE FOR CARRYING OUT THE INVENTION

An embodiment of the present invention will be described below.

Figure 1:
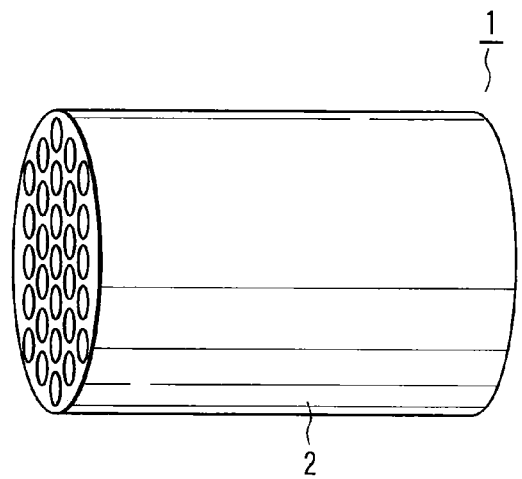
FIG. 1 is a perspective view schematically showing an exhaust gas-purifying catalyst according to an embodiment of the present invention.
Figure 2:
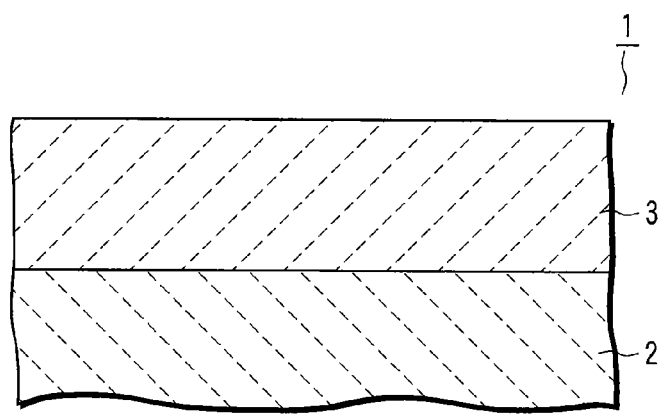
FIG. 2 is a sectional view showing a part of the exhaust gas-purifying catalyst shown in FIG. 1.

FIG. 1 is a perspective view schematically showing an exhaust gas-purifying catalyst according to an embodiment of the present invention. FIG. 2 is a sectional view showing a part of the exhaust gas-purifying catalyst shown in FIG. 1.

The exhaust gas-purifying catalyst 1 shown in FIGS. 1 and 2 is a monolith catalyst. The exhaust gas-purifying catalyst 1 includes a substrate 2 and a catalytic layer 3.

The substrate 2 is, for example, a monolith honeycomb substrate provided with through-holes. The exhaust gas to be purified is made to flow through the through-holes. The substrate 2 may have another shape. For example, the substrate 2 may be tubular.

The substrate 2 is typically made of ceramic such as cordierite. The substrate 2 may be made of metal or alloy.

The catalytic layer 3 covers the partitions that separate the through-holes from one another. The catalytic layer 3 may cover whole the partitions. Alternatively, the catalytic layer 3 may cover either of the upstream section and the downstream section of the partitions.

Figure 3:
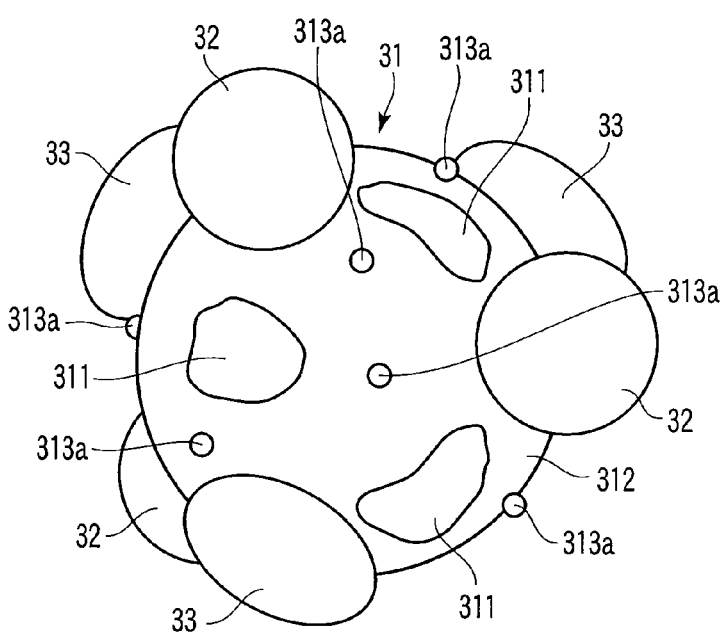
FIG. 3 is a view schematically showing an example of a material contained in the catalytic layer of the exhaust gas-purifying catalyst shown in FIGS. 1 and 2.

FIG. 3 is a view schematically showing an example of a material contained in the catalytic layer of the exhaust gas-purifying catalyst shown in FIGS. 1 and 2.

The catalytic layer 3 includes oxide particles 31, simple oxides 32 and aluminum compounds 33. Here, the "simple oxide" refers to an oxide that contains only one element as a metallic element having oxidation number of 1 or more. On the other hand, the "composite oxide" refers to an oxide that contains two or more elements as metallic elements each having oxidation number of 1 or more.

The oxide particle 31 includes a composite oxide 311 that forms a solid solution with precious metal. The oxide particle 31 further includes an oxide 312 and a precious metal 313a.

In the example shown in FIG. 3, the oxide 312 is a support, and the composite oxide 311 partially covers the surface of the support. The precious metal 313a is supported by the support.

The composite oxide 311 has a perovskite structure. The composite oxide 311 contains a composite oxide represented by a general formula: $ABO_3$, and forms a solid solution with the precious metal. Note that "A" represents alkaline-earth element, and "B" represents rare-earth element and/or zirconium.

As an example, the composite oxide 311 contains a composite oxide of alkaline-earth element and rare-earth element, and forms a first solid solution with precious metal. In this case, the oxide 312 contains as a main component the same rare-earth element as that the composite oxide 311 contains, and the precious metal 313a is made of the same precious metal as that the first solid solution is made of. For example, when the first solid solution is the solid solution of a composite oxide represented by a chemical formula $BaCeO_3$ with platinum (Pt), the oxide 312 contains ceria ($CeO_2$) as a main component and the precious metal 313a is made of platinum. Note that the solid solution of the composite oxide represented by the chemical formula $BaCeO_3$ with platinum (Pt) can be represented by a chemical formula $BaCe_{1-x}Pt_xO_3$, for example.

As another example, the composite oxide 311 contains a composite oxide of rare-earth element, alkaline-earth element and zirconium, and forms a second solid solution with precious metal. In this case, the oxide 312 contains as a main component the same rare-earth element as that the composite oxide 311 contains, and the precious metal 313a is made of the same precious metal as that the second solid solution is made of. The oxide 312 may further contain zirconia ($ZrO_2$). The oxide 312 may contain a composite oxide of rare-earth element and zirconium as a main component. For example, the second solid solution is solid solutions of $BaCeO_3$, $BaZrO_3$ and $BaZr_{1-y}Ce_yO_3$ with platinum, the oxide 312 contains ceria as a main component, and the precious metal 313a is made of platinum.

Note that the solid solution of the composite oxide represented by the chemical formula $BaCeO_3$ with platinum can be represented by a chemical formula $BaCe_{1-x}Pt_xO_3$, for example. The solid solution of the composite oxide represented by the chemical formula $BaZrO_3$ with platinum can be represented by a chemical formula $BaZr_{1-x}Pt_xO_3$, for example. The solid solution of the composite oxide represented by the chemical formula $BaZr_{1-y}Ce_yO_3$ with platinum can be represented by a chemical formula $Ba(Zr_{1-y}Ce_y)_{1-x}Pt_xO_3$, for example.

The simple oxide 32 is a simple oxide of alkaline-earth element or rare-earth element. For example, the simple oxide 32 contains magnesia (MgO). As will be described later, the simple oxide 32 plays a role in suppressing the reaction between the oxide particle 31 and the aluminum compound 33.

The aluminum compound 33 contains alumina and/or aluminum hydroxide. The aluminum compound 33 serves as a binder.

The exhaust gas-purifying catalyst 1 exhibits a reversible change in state when a composition of an atmosphere is changed under high temperature conditions. This will be described with reference to FIG. 4.

Figure 4:
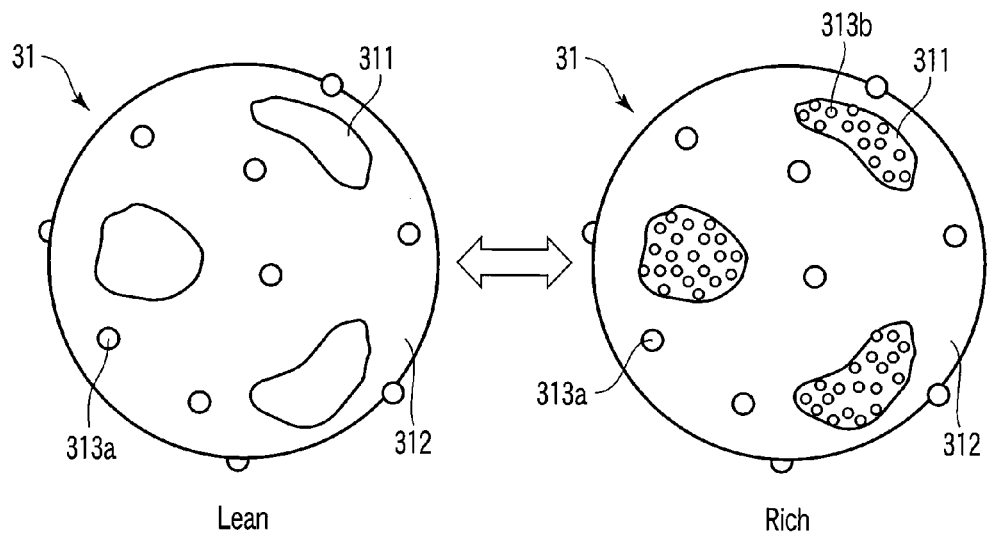
FIG. 4 is a view schematically showing a state change that the oxide particle contained in the material shown in FIG. 3 exhibits under high temperature conditions.

FIG. 4 is a view schematically showing a state change that the oxide particle contained in the material shown in FIG. 3 exhibits under high temperature conditions. In FIG. 4, the state indicated as "Lean" shows the state that the oxide particle 31 exhibits when exposed to an atmosphere with a high oxygen concentration under high temperature conditions such as temperature conditions of 1,000° C. to 1,200° C., for example, when the fuel supply to an engine is cut off. The state indicated as "Rich" shows the state that the oxide particle 31 exhibits when exposed to an atmosphere with a low oxygen concentration under high temperature conditions such as temperature conditions of 1,000° C. to 1,200° C., for example, when an abundance of fuel is continuously supplied to an engine.

The state indicated as "Lean" in FIG. 4 corresponds to the state described with reference to FIG. 3. Here, at least a part of the precious metal 313a may be oxidized; in other words, its oxidation number may be increased.

In this state, the precious metal 313a contributes to the activity of the exhaust gas-purifying catalyst 1, while the precious metal in the composite oxide 311 hardly contributes to the activity. However, during the period over which the oxide particle 31 is in the state indicated as "Lean", a concentration of offensive components such as nitrogen oxides, carbon monoxide, hydrocarbons, and the like in the exhaust gas, that is, an offensive component concentration in an atmosphere is relatively low. Thus, the exhaust gas-purifying catalyst 1 delivers a sufficient performance.

When the oxygen concentration in the atmosphere is lowered under the high temperature conditions, the oxide particle 31 causes a change from the state indicated as "Lean" to the state indicated as "Rich". Specifically, the precious metal 313b is precipitated out of the composite oxide 311.

During the period over which the oxide particle 31 is in the state indicated as "Rich", the offensive component concentration in the exhaust gas is relatively high. That is, during the period corresponding to the state indicated as "Rich", the exhaust gas-purifying catalyst 1 is required to be higher in activity as compared to the period corresponding to the state indicated as "Lean".

The precious metal 313b is much smaller in size than the precious metal 313a. For example, the size of the precious metal 313b is several nanometers or less, while the size of the precious metal 313a is several tens of nanometers. Thus, the exhaust gas-purifying catalyst 1 whose oxide particle 31 is in the state indicated as "Rich" is higher in activity than the exhaust gas-purifying catalyst 1 whose oxide particle 31 is in the state indicated as "Lean". Therefore, the exhaust gas-purifying catalyst 1 delivers a sufficient performance even when the offensive component concentration in the exhaust gas is high.

The oxide particle 31 in the state indicated as "Rich" causes a change to the state indicated as "Lean" when the oxygen concentration in the atmosphere increases under the high temperature conditions. That is, the precious metal 313b and the composite oxides 311 form the solid solution. Note that precious metal hardly forms a solid solution with a simple oxide.

As described above, the oxide particle 31 causes a reversible change in state. In addition, the oxide particle 31 forms the ultrafine precious metals 313b on the surfaces of the composite oxide 311 every time it causes the change from the state indicated as "Lean" to the state indicated as "Rich". Therefore, this state is recovered by the change from the state indicated as "Rich" to the state indicated as "Lean" and its reverse change. Since an automotive vehicle changes the oxygen concentration in the exhaust gas at relatively close intervals, the exhaust gas-purifying catalyst 1 always exhibits a high activity to deriver a sufficient performance when exposed to a low oxygen concentration atmosphere at high temperatures.

Also, in the exhaust gas-purifying catalyst 1, the precious metal 313a contributes to the activity of the exhaust gas-purifying catalyst 1 regardless of the composition of the atmosphere and temperature. Therefore, the exhaust gas-purifying catalyst 1 delivers a sufficient performance not only when exposed to a high oxygen concentration atmosphere at high temperatures, but also when used for the first time or used under low temperature conditions.

Further, when the oxygen concentration in the atmosphere is increased under high temperature conditions, the exhaust gas-purifying catalyst 1 makes the precious metal 313b and the composite oxide 311 form the solid solution as described above. Thus, the exhaust gas-purifying catalyst 1 is low in the evaporation loss of precious metal in the high oxygen concentration atmosphere.

In the case where the catalytic layer 3 does not contain the simple oxide 32, the oxide particle 31 reacts with the aluminum compound 33 when the exhaust gas-purifying catalyst 1 is heated to high temperatures, for example 1,000° C. or higher. For example, when the composite oxide 311 is represented by the chemical formulae $BaCeO_3$, $BaZrO_3$ and $BaZr_{1-y}Ce_yO_3$, the oxide particle 31 and the aluminum compound 33 react together to produce a composite oxide represented by a chemical formula $BaAl_2O_4$. Thus, when the reaction occurs, the activity of the exhaust gas-purifying catalyst 1 is lowered.

By contrast, in the case where the catalytic layer 3 contains the simple oxide 32, the reaction between the oxide particle 31 and the aluminum compound 33 hardly occurs when the exhaust gas-purifying catalyst 1 is heated to high temperatures, and the simple oxide 32 reacts with the aluminum compound 33 instead. For example, when the composite oxide 311 is represented by the chemical formulae $BaCeO_3$, $BaZrO_3$ and $BaZr_{1-y}Ce_yO_3$ and the simple oxide 32 contains magnesia, the simple oxide 32 and the aluminum compound 33 react together to produce a composite oxide represented by a chemical formula $MgAl_2O_4$, so as to suppress the reaction between the oxide particle 31 and the aluminum compound 33. Thus, the exhaust gas-purifying catalyst 1 is less prone to cause a decrease in its activity.

Figure 5:
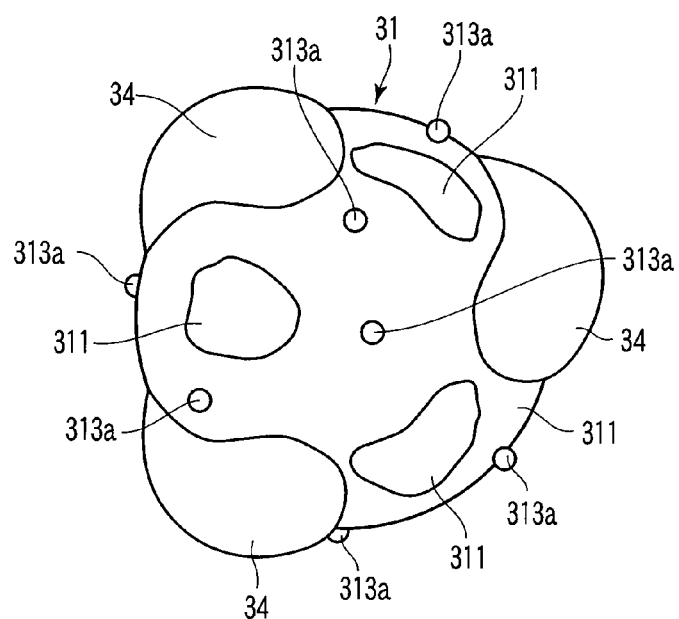
FIG. 5 is a view schematically showing an example of the material obtained by heating the material shown in FIG. 3 to high temperatures.

FIG. 5 is a view schematically showing an example of the material obtained by heating the material shown in FIG. 3 to high temperatures.

When the material shown in FIG. 3 is heated to high temperatures, the simple oxide 32 reacts with at least a part of the aluminum compound 33 to produce the composite oxide 34 shown in FIG. 5. Similar to the aluminum compound 33, the composite oxide 34 serves as a binder. Thus, the exhaust gas-purifying catalyst 1 is less prone to cause the separation of the catalytic layer 3 from the substrate 2 even after producing the composite oxide 34.

In the above example, described is the case where the oxide particle 31 contains cerium as the rare-earth element. Another element may be used as the rare-earth element. For example, lanthanum, praseodymium, neodymium, etc. may be used. Alternatively, a plurality of rare-earth elements may be used.

The alkaline-earth element contained in the oxide particle 31 may be an element other than barium. For example, strontium, calcium, magnesium, etc. may be used. Alternatively, a plurality of alkaline-earth elements may be used.

As the precious metals 313a and 313b, an element other than platinum may be used. For example, an element of platinum group such as palladium or rhodium may be used. Alternatively, a plurality of precious metals may be used.

As the simple oxide 32, an oxide other than magnesia may be used. For example, the simple oxide 32 may be an oxide of beryllium, calcium, strontium, barium, lanthanum, praseodymium or neodymium.

In the case where the oxide particle 31 contains the first solid solution, the atomic ratio of alkaline-earth element with respect to rare-earth element in the oxide particle 31 is set, for example, within a range of 1 atomic % to 80 atomic %, and typically within a range of 10 atomic % to 50 atomic %. When the atomic ratio is small, the volume ratio of the composite oxide 311 with respect to the oxide 312 is small. Thus, the recovery in performance of the exhaust gas-purifying catalyst 1 caused by the composition fluctuation of the atmosphere may be insufficient. In the case where the atomic ratio is excessively large, oxidation, i.e., increase in oxidation number may become difficult to occur when the oxygen concentration in atmosphere is increased at high temperatures. Thus, it may become difficult to produce the solid solution of the precious metal and the composite oxide when the concentration of oxygen in atmosphere is increased at high temperatures, and as a result, the sintering of precious metal may be prone to occur.

In the case where the oxide particle 31 contains the second solid solution, the atomic ratio of alkaline-earth element with respect to the sum of rare-earth element and zirconium in the oxide particle 31 is set, for example, within a range of 0.1 atomic % to 10 atomic %, and typically within a range of 0.3 atomic % to 5 atomic % when used under high temperature conditions of, for example, 700° C. or higher and lower than 1,000° C. The atomic ratio is set, for example, at 10 atomic % or more, and typically 20 atomic % or more when used under high temperature conditions of, for example, 1,000° C. or higher. In this case, the atomic ratio is, for example, 100 atomic % or less, and typically 80 atomic % or less.

When the atomic ratio is small, the volume ratio of the composite oxide 311 with respect to the oxide 312 is small. Thus, the recovery in performance of the exhaust gas-purifying catalyst 1 caused by the composition fluctuation of the atmosphere may be insufficient. In the case where the atomic ratio is increased excessively, the ratio of the precious metal 313a with respect to whole the precious metal supported by the composite oxide 311 and the oxide 312 is lowered. Thus, it may be possible that a sufficient catalytic activity cannot be obtained under high temperature and high oxygen concentration conditions. Further, in the case where the atomic ratio is increased excessively, a heat-resisting property of the oxide 312 is deteriorated when used at high temperatures. As a result, the sintering of precious metal may be prone to occur.

The precious metal content of the oxide particle 31 is set, for example, within a range of 0.01% to 10% by weight, and typically within a range of 0.1% to 5% by weight. When the precious metal content is small, a sufficient catalytic activity may not be achieved. When the precious metal content is large, the sintering of precious metal may be prone to occur.

The ratio of precious metal forming a solid solution with respect to whole the precious metal supported by the composite oxide 311 and the oxide 312 (hereinafter referred to as a "solid solution-forming ratio") is set, for example, within a range of 10% to 80%. When the solid solution-forming ratio is small, the effect of suppressing the decrease in activity due to the sintering of precious metal may be insufficient. When the solid solution-forming ratio is large, the initial activity may be insufficient.

The exhaust gas-purifying catalyst can be manufactured, for example, by the following method.

First, a powdery oxide 312 containing a rare-earth oxide or a composite oxide of rare-earth element and zirconium as a main component is prepared and made into slurry. Here, water is used as the dispersion medium, for example. Then, a solution of precious metal salt is added to the slurry, and the resultant mixture is filtrated. Thereafter, drying and firing of the filter cake are carried out sequentially. In this way, the precious metal is loaded onto the oxide 312.

Next, the oxide 312 supporting the precious metal is added to a solution of alkaline-earth salt. Then, the slurry is heated so as to sufficiently remove liquid. Thus, the alkaline-earth element is loaded onto the oxide 312.

The method of loading the alkaline-earth element onto the oxide 312 is not limited. For example, a method that the oxide 312 supporting the precious metal is impregnated with the solution of the alkaline-earth salt, a method utilizing coprecipitation, a method using an alkoxide of alkaline-earth metal, and the like may be used.

Then, the oxide 312 supporting the precious metal and the alkaline-earth element is fired in an oxidizing atmosphere. Thus, the composite oxide 311 of the rare-earth element and the alkaline-earth element or the composite oxide 311 of the rare-earth element, the alkaline-earth element and zirconium together with the solid solution of the composite oxide 311 and the precious metal are produced so as to obtain the oxide particles 31 shown in FIG. 3.

Note that the firing temperature is set, for example, within the range of about 700° C. to about 1,100° C. When the firing temperature is low, the production of the composite oxide 311 is difficult. When the firing temperature is high, the specific surface area of the oxide 312 is decreased, and therefore, it becomes difficult to satisfactorily distribute the precious metal 313a over the oxide 312. As a result, a high activity may not be obtained.

Then, a slurry containing the oxide particles 31 and the aluminum compound 33 is prepared, and the slurry is applied to the substrate 2 shown in FIG. 2 to form a coating film. Alternatively, a slurry is prepared by dispersing the oxide particles 31 into a solution of compounds as the raw material of the aluminum compound 33, and the slurry is applied to the substrate 2 to form a coating film. Here, water is used as the dispersing medium or solvent, for example. As the aluminum compound 33 and/or the raw material thereof, alumina, aluminum hydroxide, inorganic salts of aluminum, organic salts of aluminum, aluminum alkoxide, or the mixture thereof is used, for example.

Then a slurry containing the simple oxide 32 is applied to the dried coating film. Alternatively, the dried coating film is impregnated with a solution containing a rare-earth compound or alkaline-earth compound as a raw material of the simple oxide. Here, water is used as the dispersing medium or solvent, for example. As the raw material of the simple oxide 32, hydroxide, inorganic salt, organic salt or alkoxide of rare-earth element or alkaline-earth element, or the mixture thereof is used, for example. The atomic ratio of the rare-earth element or the alkaline-earth element contained in the simple oxide 32 and/or the raw material thereof with respect to the aluminum contained in the aluminum compound 33 and/or the raw material thereof is set, for example, within a range of 0.05 to 2.0, and typically within a range of 0.1 to 1.0.

Thereafter, the coating film is subjected to a heat treatment in an oxidizing atmosphere. The temperature of the heat treatment is set, for example, within a range of 480° C. to 700° C. In the case where the aluminum compound is a compound other than alumina and aluminum hydroxide, the aluminum compound is oxidized by this heat treatment to produce alumina and/or aluminum hydroxide. In the case where the rare-earth compound or the alkaline-earth compound is used instead of the simple oxide 32, the rare-earth compound or the alkaline-earth compound is oxidized by this heat treatment to produce a simple oxide of the rare-earth element or the alkaline-earth element.

The catalytic layer 3 containing the material shown in FIG. 3 is thus obtained. That is, the exhaust gas-purifying catalyst 1 shown in FIGS. 1 and 2 is obtained.

In this method, after the coating film containing the oxide particles 31 and the aluminum compound 33 or the raw material thereof is formed on the substrate 2, the slurry containing the simple oxide 32 is applied to the coating film, or the coating film is impregnated with the solution containing the raw material of the simple oxide 32. Alternatively, it is possible that a slurry containing the oxide particles 31, the aluminum compound 33 or the raw material thereof, and the simple oxide 32 or the raw material thereof is prepared, and the slurry is applied to the substrate 2 shown in FIG. 2.

In the exhaust gas-purifying catalyst 1 obtained by the above method, the catalytic layer 3 contains the material shown in FIG. 3. Therefore, the change from the state shown in FIG. 3 to the state shown in FIG. 5 occurs during the period the exhaust gas-purifying catalyst 1 is used for purifying the exhaust gas, for example. It is possible to make the change occur before the exhaust gas-purifying catalyst 1 is used for purifying the exhaust gas. For example, a heat treatment in an oxidizing atmosphere may be further performed at higher temperatures after the above-described heat treatment to produce the composite oxide of the aluminum contained in the aluminum compound 33 and the rare-earth element or alkaline-earth element contained in the simple oxide 32. Alternatively, the above-described heat treatment may be performed at higher temperatures to produce the composite oxide of aluminum and the rare-earth element or alkaline-earth element. The temperature of the heat treatment for producing the composite oxide of aluminum and the rare-earth element or alkaline-earth element is set, for example, within a range of 800° C. to 1,100° C.

Example of the present invention will be described below.

<Preparation of Powder P1>

Cerium nitrate [$Ce(NO_3)_3$] and zirconium oxynitrate [$ZrO(NO_3)_2$] were weighed such that the atomic ratio of cerium to zirconium was 50:50 and were added to 500 mL of deionized water. After stirring sufficiently, an aqueous solution containing 10% by weight of ammonium hydroxide was dropped into the aqueous solution at room temperature to cause coprecipitation. The aqueous solution containing the copricipitate was stirred for 60 minutes and then filtrated.

The filter cake was sufficiently washed with deionized water and dried at 110° C. The dried material was subjected to a calcination at 500° C. for 3 hours in the atmosphere. The calcined material was crushed by using a mortar and fired at 800° C. for 5 hours in the atmosphere.

The measurement of diffraction spectrum utilizing an X-ray diffractometer was carried out on the powder thus obtained. As a result, it was proved that the powder was made of an oxide represented by a chemical formula: $Ce_{1-z}Zr_zO_2$. Note that the specific surface area of the powder was 90 $m^2/g$.

Next, 50 g of the oxide powder was weighed and added into 500 mL of deionized water. After the oxide powder was well dispersed in the deionized water by 10 minutes of ultrasonic agitation, a solution of dinitrodiamine platinum nitrate was added to the slurry. The concentration and amount of the dinitrodiamine platinum nitrate solution were adjusted such that the platinum content in the oxide particles 31 would be 0.5% by mass.

After that, the slurry was filtrated under suction. The filtrate was subjected to inductively coupled plasma (ICP) spectrometry. As a result, it was revealed that the filter cake contained almost the entire platinum in the slurry.

Next, the filter cake was dried at 110° C. for 12 hours. Then, it was calcined at 500° C. in the atmosphere. Thus, platinum was loaded onto the oxide.

Subsequently, barium acetate was dissolved into 100 mL of deionized water. Then, 50 g of the oxide supporting platinum was weighed and added into the barium acetate solution. Note that the concentration of the barium acetate solution was adjusted such that the atomic ratio of barium with respect to the sum of cerium and zirconium in the oxide particles 31 would be 10.0 atomic %.

Then, the slurry was heated so as to remove the excess water. Next, it was fired at 1,000° C. for 3 hours in the atmosphere. Thus, a composite oxide containing barium and a solid solution of the composite oxide with platinum were produced. Hereinafter, the powder thus obtained is referred to as a "powder P1".

The measurement of diffraction spectrum utilizing an X-ray diffractometer was carried out on the powder P1. As a result, it was proved that the powder P1 contained a composite oxide represented by the chemical formula: $BaCeO_3$, a composite oxide represented by the chemical formula: $BaZrO_3$, and a composite oxide represented by the chemical formula: $BaZr_{1-y}Ce_yO_3$, in addition to a composite oxide represented by the chemical formula: $Ce_zZr_{1-z}O_2$.

A part of the powder P1 was taken and immersed for 12 hours in a 10% aqueous hydrogen fluoride held at room temperature. Note that this condition allowed only the barium-containing composite oxide of the above powder to be dissolved. Subsequently, the solution was filtrated, and the filtrate was subjected to ICP spectrometry. As a result, the platinum content of the filtrate revealed that 45% of platinum formed the solid solution, in other words, the solid solution-forming ratio was 45%.

<Preparation of Powder P2>

Powder was prepared by the same method as described for the powder P1 except that the steps from the addition of the oxide supporting platinum into the aqueous solution of barium acetate to the firing thereafter were omitted. Hereinafter, the powder thus obtained is referred to as a "powder P2".

<Performance Evaluations on Powder P1 and P2>

The powder was compression-molded and the molded product was crushed so as to obtain pellets having diameters of about 0.5 mm to about 1.0 mm. Hereinafter, the pellets are referred to as "pellets PL1". Then, the powder was compression-molded and the molded product was crushed so as to obtain pellets having diameters of about 0.5 mm to about 1.0 mm. Hereinafter, the pellets are referred to as "pellets PL2".

Next, using the pellets PL1 and PL2, the endurances of the power P1 and P2 were tested by the following method.

First, the pellets PL1 and PL2 were set in flow-type endurance test apparatuses, and a gas containing nitrogen as a main component was made to flow through each catalyst bed at a flow rate of 100 mL/minute for 30 hours. The temperature of the catalyst bed was held at 1,050° C. As the gas made to flow through the catalyst bed, a lean gas prepared by adding oxygen to nitrogen at a concentration of 5% and a rich gas prepared by adding carbon monoxide to nitrogen at a concentration of 10% were used, and these gases were switched at intervals of 5 minutes.

Next, pellets PL1 and PL2 were set in atmospheric fixed bed flow reactors. Then, the temperature of each catalyst bed was raised from 100° to 500° C. at the temperature increase rate of 12° C./minute and each exhaust gas-purifying ratio was continuously measured while a model gas was made to flow through the catalyst bed. As the model gas, the gas containing equivalent amounts of oxidizing components (oxygen and nitrogen oxides) and reducing components (carbon monoxide, hydrocarbons and hydrogen), which were adjusted stoichiometrically, was used.

As a result, the pellets PL1 could purify 50% or more of hydrocarbons contained in the model gas when the catalyst bed was set at 319° C. or higher, and could purify 50% or more of nitrogen oxides contained in the model gas when the catalyst bed was set at 334° C. or higher. On the other hand, the catalyst bed must be set at 412° C. or higher in order for the pellets PL2 to purify 50% or more of hydrocarbons contained in the mode gas, and the catalyst bed must be set at 451° C. or higher in order for the pellets PL2 to purify 50% or more of nitrogen oxides contained in the mode gas. This result reveals that the powder P1 is excellent in endurance as compared with the powder P2.

Next, the pellets PL1 were set in the flow-type endurance test apparatus again, and the lean gas was made to flow therethrough. Then, the gas made to flow through the catalyst bed was switched from the lean gas to the rich gas. Note that the temperature of the catalyst bed was held at 1,050° C. Thereafter, the temperature of the catalyst bed was lowered while the rich gas was kept flowing through the catalyst bed.

After the temperature of the catalyst bed was lowered sufficiently, the pellets PL1 were observed by a transmission electron microscope (TEM).

As a result, many platinum (Pt) precipitates were formed on the composite oxides containing barium, and the sizes of the platinum precipitates were very small. As above, many ultrafine platinum particles were present on the composite oxide just after switching the flow gas from the lean gas to the rich gas under high temperature conditions.

After that, the pellets PL1 were set in the flow-type endurance test apparatus, and the above lean gas was made to flow through the catalyst bed while the catalyst bed was held at 1,050° C. Then, the temperature of the catalyst bed was lowered while the lean gas was kept flowing through the catalyst bed. After the temperature of the catalyst bed was lowered sufficiently, a part of the pellets PL1 was drawn therefrom, measurement of diffraction spectrum utilizing an X-ray diffractometer was carried out thereon, and the solid solution-forming ratio was determined thereon by the same method as described above.

Next, the catalyst bed containing the remainder of the pellets PL1 was heated to 1,050° C., and the above rich gas was made to flow through the catalyst bed. Then, the temperature of the catalyst bed was lowered while the rich gas was kept flowing through the catalyst bed. After the temperature of the catalyst bed was lowered sufficiently, a part of the pellets PL1 was drawn therefrom, measurement of diffraction spectrum utilizing an X-ray diffractometer was carried out thereon, and the solid solution-forming ratio was determined thereon by the same method as described above.

Further, the catalyst bed containing the remainder of the pellets PL1 was heated to 1,05° C., and the above lean gas was made to flow through the catalyst bed. Then, the temperature of the catalyst bed was lowered while the lean gas was kept flowing through the catalyst bed. After the temperature of the catalyst bed was lowered sufficiently, a part of the pellets PL1 was drawn therefrom, measurement of diffraction spectrum utilizing an X-ray diffractometer was carried out thereon, and the solid solution-forming ratio was determined thereon by the same method as described above.

As a result, the position of the peak originated from composite oxide represented by the chemical formula: $BaZrO_3$ was shifted toward the side of small angle when the flow gas was switched from the lean gas to the rich gas and was shifted toward the side of large angle when the flow gas was switched from the rich gas to the lean gas. Further, the position of the peak was shifted toward the side of small angle when the flow gas was switched from the lean gas to the rich gas again. This reveals that the composite oxide exhibits a reversible change in state when a composition of an atmosphere is changed.

In addition, the solid solution-forming ratio was increased when the flow gas was switched from the rich gas to the lean gas at high temperatures and was decreased when the flow gas was switched from the lean gas to the rich gas. This reveals that the pellets PL1 produce the solid solution of the composite oxide with platinum by switching the flow gas from the rich gas to the lean gas at high temperatures, and platinum is precipitated out of the composite oxide by switching the gas made to flow from the lean gas to the rich gas at high temperatures.

<Manufacture of Catalyst C1>

The exhaust gas-purifying catalyst 1 shown in FIGS. 1 and 2 was manufactured by the following method.

100 parts by mass of the powder P1, 40 parts by mass of magnesium acetate [$Mg(CH_3COO)_2$], 20 parts by mass of aluminum hydroxide [$Al(OH)_3$], and 150 parts by mass of deionized water were mixed, and the mixture was subjected to ball milling for 30 minutes. The slurry thus obtained was applied to a monolith honeycomb substrate 2 having a volumetric capacity of 1 L, and the coating film was dried at 250° C. for 1 hour. Thereafter, the coating film was calcined at 500° C. for 1 hour in the atmosphere. By the above method, the exhaust gas-purifying catalyst 1 shown in FIGS. 1 and 2 was obtained. Hereinafter, the exhaust gas-purifying catalyst is referred to as a "catalyst C1".

<Manufacture of Catalyst C2>

The exhaust gas-purifying catalyst 1 shown in FIGS. 1 and 2 was manufactured by the following method.

First, 100 parts by mass of the powder P1, 20 parts by mass of aluminum hydroxide [$Al(OH)_3$], and 150 parts by mass of deionized water were mixed, and the mixture was subjected to ball milling for 30 minutes. The slurry thus obtained was applied to a monolith honeycomb substrate 2 having a volumetric capacity of 1 L, and the coating film was dried at 250° C. for 1 hour. Thereafter, the coating film was calcined at 500° C. for 1 hour in the atmosphere.

Next, 40 parts by mass of magnesium acetate [$Mg(CH_3COO)_2$] was dissolved into 80 parts by mass of deionized water, the above-described monolith honeycomb substrate 2 was dipped into the solution. After the monolith honeycomb substrate 2 was removed from the solution, the coating film was dried at 250° C. for 1 hour. Note that the whole amount of the magnesium acetate could not be loaded onto the monolith honeycomb substrate 2. Therefore, the dipping and the drying are repeated until the container became empty of the solution. Thereafter, the coating film was calcined at 500° C. for 1 hour in the atmosphere. By the above method, the exhaust gas-purifying catalyst 1 shown in FIGS. 1 and 2 was obtained. Hereinafter, the exhaust gas-purifying catalyst is referred to as a "catalyst C2".

<Manufacture of Catalyst C3>

An exhaust gas-purifying catalyst was manufactured by the same method as described for the catalyst C2 except that dipping the monolith honeycomb substrate into the aqueous solution of magnesium acetate and the steps thereafter were omitted.

That is, 100 parts by mass of the powder P1, 20 parts by mass of aluminum hydroxide [$Al(OH)_3$], and 150 parts by mass of deionized water were mixed, and the mixture was subjected to ball milling for 30 minutes. The slurry thus obtained was applied to a monolith honeycomb substrate 2 having a volumetric capacity of 1 L, and the coating film was dried at 250° C. for 1 hour. Thereafter, the coating film was calcined at 500° C. for 1 hour in the atmosphere. By the above method, an exhaust gas-purifying catalyst was obtained. Hereinafter, the exhaust gas-purifying catalyst is referred to as a "catalyst C3".

<Performance Evaluations on Catalysts C1 to C3>

Each of the catalysts C1 to C3 was mounted to an exhaust system connected to an engine with a piston displacement of 4 L, and the cycle described below was repeated for 40 hours. Specifically, the period for a single cycle was set at 30 seconds, and each cycle period was constituted by first to fourth periods described below.

The first period is the period of 5 seconds from the beginning of each cycle period. During the first period, under the feedback control for holding the internal temperature of the catalyst at about 850° C., a mixture gas whose air-fuel ratio was set at the theoretical air-fuel ratio (A/F=14.6, stoichiometric condition) was supplied to the engine to cause the combustion of the mixture gas.

The second period is the period of 2 seconds subsequent to the first period. During the second period, the feedback control was suspended and an excess amount of the fuel was injected so as to supply the engine with a mixture gas rich in the fuel (A/F=11.2). During the second period, the combustion of the mixture gas was prevented, and the as-is mixture gas was supplied to the engine.

The third period is the period of 21 seconds subsequent to the second period. During the third period, the mixture gas rich in the fuel (A/F=11.2) was supplied to the engine while continuing the suspension of the feedback control and the injection of an excess amount of the fuel as in the second period. Also during the third period, as in the second period, the combustion of the mixture gas was prevented. However, during the third period, a secondary air was made to flow through an inlet pipe into the flow path connecting the engine with the catalyst. By doing so, the mixture gas to be supplied to the catalyst was changed to a lean gas whose air-fuel ratio (A/F=14.8) is close to the theoretical air-fuel ratio and the fuel was reacted with the secondary air within the catalyst so as to increase the temperature of the catalyst. In the third period, the maximum temperature reached by the catalyst was 1,000° C.

The fourth period is the period of two seconds subsequent to the third period. During the fourth period, under the feedback control for holding the internal temperature of the catalyst at about 850° C., the mixture gas whose air-fuel ratio was set at the theoretical air-fuel ratio (A/F=14.6, stoichiometric condition) was supplied to the engine to cause the combustion of the mixture gas as in the first period. During the fourth period, the secondary air was made to flow through the inlet pipe into the flow path connecting the engine with the catalyst as in the third period.

It is noted that the temperature of the catalyst was measured using a thermocouple inserted in a center portion of the honeycomb substrate. Phosphorus compounds were added to the fuel (gasoline) in order to poison the catalyst with the elemental phosphorus contained in the exhaust gas. The amount of the phosphorus compounds added to the fuel was set such that the amount of the elemental phosphorus and/or phosphorus compounds attached to the catalyst after repeating the cycle for 40 hours was equivalent to 50 mg of elemental phosphorus.

After repeating the cycles for 40 hours, each of the catalysts C1 to C3 was subjected to annealing at 900° C. for 2 hours while supplying a mixture gas having an air-fuel ratio A/F of 14.3.

Then, the catalysts C1 to C3 were mounted to automobiles each having an engine with a piston displacement of 2.2 L. Each automobile was driven in the LA#4 mode in compliance with the Federal Test Procedure FTP75, and the relation between the temperature of the catalyst and the efficiency of purification was investigated. The results are summarized in the following table.

TABLE 1

| Catalyst | 50% purifying temperature (° C.) | |
| --- | --- | --- |
|  | HC | NO$_x$ |
| C1 | 320 | 336 |
| C2 | 325 | 329 |
| C3 | 395 | 420 |

In the above table, the column denoted by "50% purifying temperature" shows the lowest temperature of the catalyst bed at which 50% or more of each component contained in the model gas was purified. The columns denoted by "HC" and "NO$_x$" show the data for hydrocarbons and nitrogen oxides, respectively.

As shown in the table, the catalysts C1 and C2 could purify the model gas at lower temperatures as compared with the catalyst C3. This result revealed that the catalysts C1 and C2 were excellent in endurance as compared with the catalyst C3.

After the endurance test, the catalytic layers of the catalysts C1 to C3 were sampled. Then, the measurements of diffraction spectrum utilizing the X-ray diffractometer were carried out thereon. The results are shown in FIG. 6.

Figure 6:
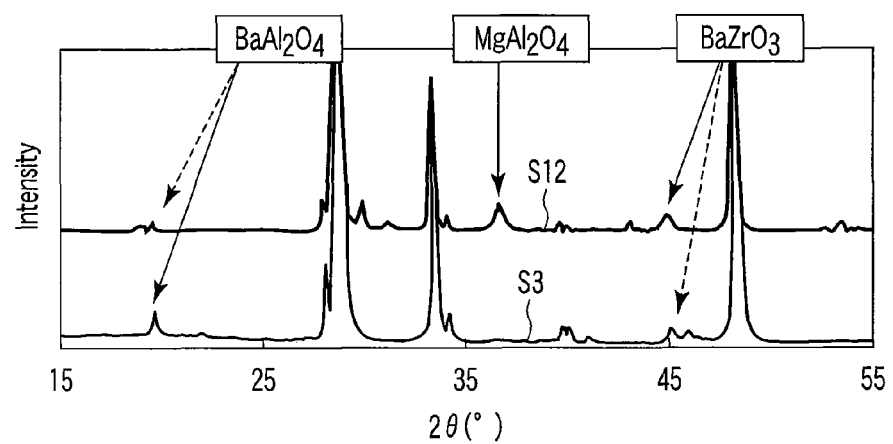
FIG. 6 is a graph showing X-ray diffraction spectra of the exhaust gas-purifying catalysts obtained after an endurance test.

FIG. 6 is a graph showing X-ray diffraction spectra of the exhaust gas-purifying catalysts obtained after an endurance test. In the figure, the abscissa denotes the diffraction angle, while the ordinate denotes the detected intensity. Also, in the figure, the curve S12 represents the X-ray diffraction spectrum obtained on the catalytic layers of the catalyst C1 and C2, and the curve S3 represents the X-ray diffraction spectrum obtained on the catalytic layer of the catalyst C3.

As shown in FIG. 6, the peak of the spectrum S12 originated from the composite oxide represented by the chemical formula: $BaAl_2O_4$ is lower than that of the spectrum S3. This reveals that the decomposition of the oxide particles 31 is less prone to occur in the catalyst C1 and C2 as compared with the catalyst C3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An exhaust gas-purifying catalyst comprising a substrate and a catalytic layer supported by the substrate, the catalytic layer comprising:
    an oxide particle containing
        an oxide of at least one of cerium and zirconium,
        a composite oxide containing barium, cerium and zirconium, and
        a precious metal, the composite oxide and a part of the precious metal forming a solid solution;
    a particle of a simple oxide of magnesium, supported by the oxide particle; and
    a particle of alumina and/or aluminum hydroxide, supported by the oxide particle,
        wherein an atomic ratio of barium with respect to the sum of cerium and zirconium in the oxide particle is within a range of 0.1 atomic % to 100 atomic % and wherein an atomic ratio of the magnesium to the aluminum falls within a range of 0.05 to 2.0.

2. The catalyst according to claim 1, wherein an atomic ratio of the magnesium to the aluminum falls within a range of 0.1 to 1.0.

3. The catalyst according to claim 1, wherein a ratio of the part of the precious metal forming the solid solution to the precious metal contained in the oxide particle is within a range of 10% to 80%.

4. A method of manufacturing an exhaust gas-purifying catalyst, comprising:
    forming a catalytic layer on a substrate, the catalytic layer containing
        an oxide particle containing
            an oxide of at least one of cerium and zirconium,
            a composite oxide containing barium, cerium and zirconium, and
            a precious metal, the composite oxide and a part of the precious metal forming a solid solution;
        a particle of a first compound including aluminum, supported by the oxide particle, and a particle of a second compound including magnesium, supported by the oxide particle, wherein an atomic ratio of barium with respect to the sum of cerium and zirconium in the oxide particle is within a range of 0.1 atomic % to 100 atomic % and wherein an atomic ratio of the magnesium included in the second compound to the aluminum included in the first compound falls within a range of 0.05 to 2.0; and subjecting the catalytic layer to a heat treatment in an oxidizing atmosphere.

5. The method according to claim 4, wherein an atomic ratio of the magnesium included in the second compound to the aluminum included in the first compound falls within a range of 0.01 to 1.0.

6. The method according to claim 4, wherein a ratio of the part of the precious metal forming the solid solution to the precious metal contained in the oxide particle is within a range of 10% to 80%.

* * * * *